June 3, 1930.  W. A. WHITE  1,761,505
SEPARATION OF LIQUIDS OF DIFFERENT SPECIFIC GRAVITIES
Filed Jan. 27, 1928  3 Sheets-Sheet 1

W. A. White
INVENTOR

By Marks & Clerk
Attys.

June 3, 1930.  W. A. WHITE  1,761,505
SEPARATION OF LIQUIDS OF DIFFERENT SPECIFIC GRAVITIES
Filed Jan. 27, 1928    3 Sheets-Sheet 2

W. A. White
INVENTOR
By: Marks & Clerk
Attys.

June 3, 1930. W. A. WHITE 1,761,505
SEPARATION OF LIQUIDS OF DIFFERENT SPECIFIC GRAVITIES
Filed Jan. 27, 1928 3 Sheets-Sheet 3
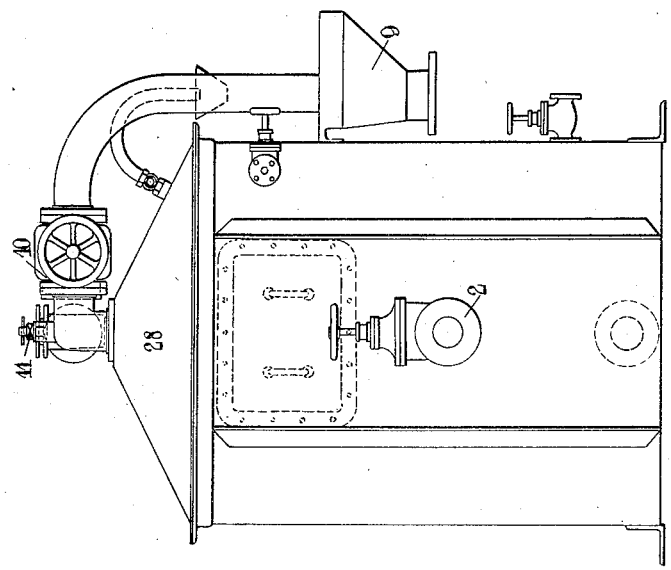
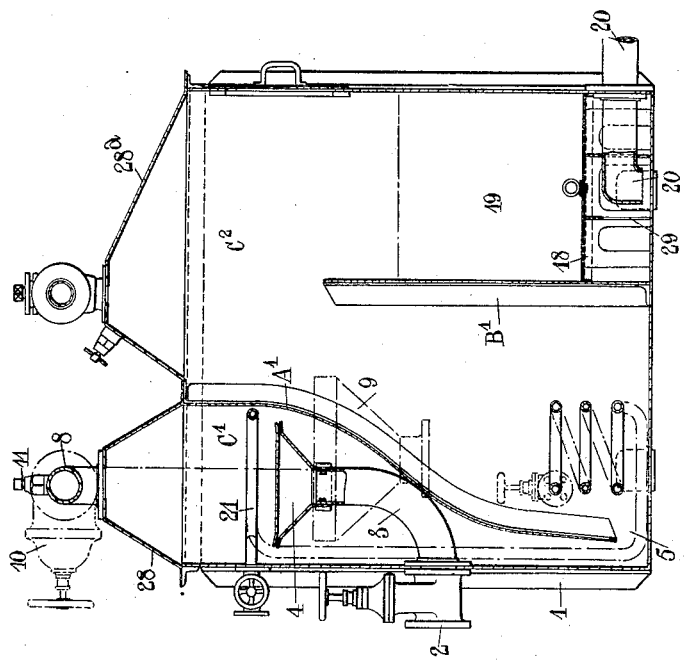
W. A. White
INVENTOR Patented June 3, 1930

1,761,505

UNITED STATES PATENT OFFICE

WILLIAM ALBERT WHITE, OF HEBBURN-ON-TYNE, ENGLAND, ASSIGNOR TO WHITE OIL SEPARATORS LIMITED, OF HEBBURN-ON-TYNE, ENGLAND

SEPARATION OF LIQUIDS OF DIFFERENT SPECIFIC GRAVITIES

Application filed January 27, 1928, Serial No. 249,971, and in Great Britain June 7, 1927.

This invention relates to apparatus for the separation of liquids of different specific gravities such as oil and water.

Certain separating apparatus for dealing with oil and water has been designed for working under atmospheric pressure and therefore has to be installed upon the ship above the water line. This, however, is not always convenient and one object of the present invention is to overcome this disadvantage.

With such an object:—

The present invention consists in the improved separating apparatus designed to work under pressure or atmospheric conditions as desired to be hereinafter described or indicated.

Referring to the accompanying diagrammatic drawings which show different constructional forms of the invention:—

Figure 1:
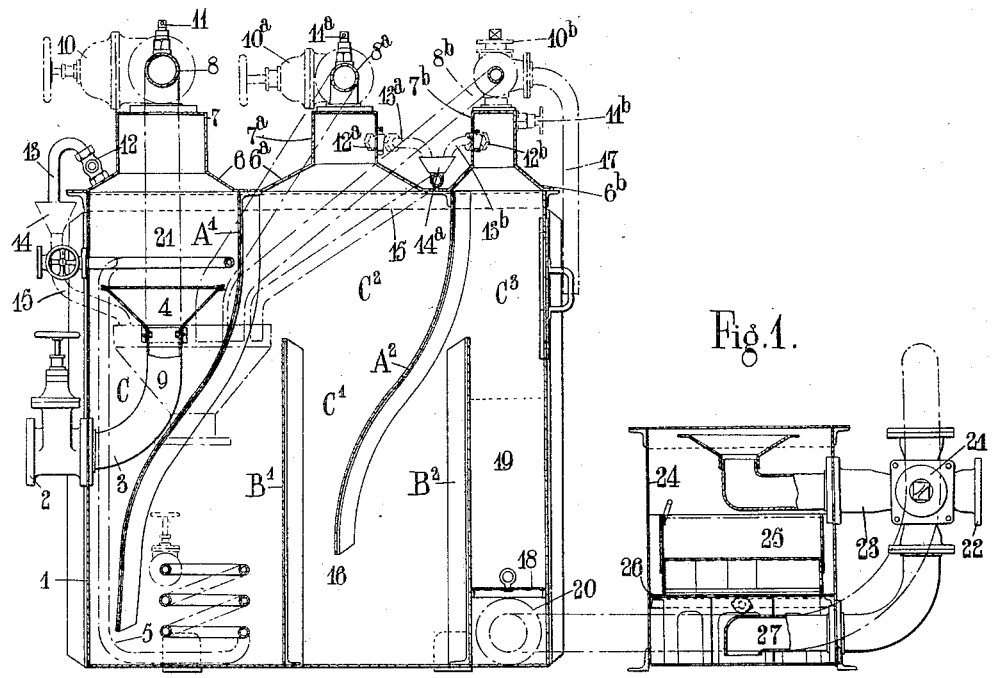
Figure 2:
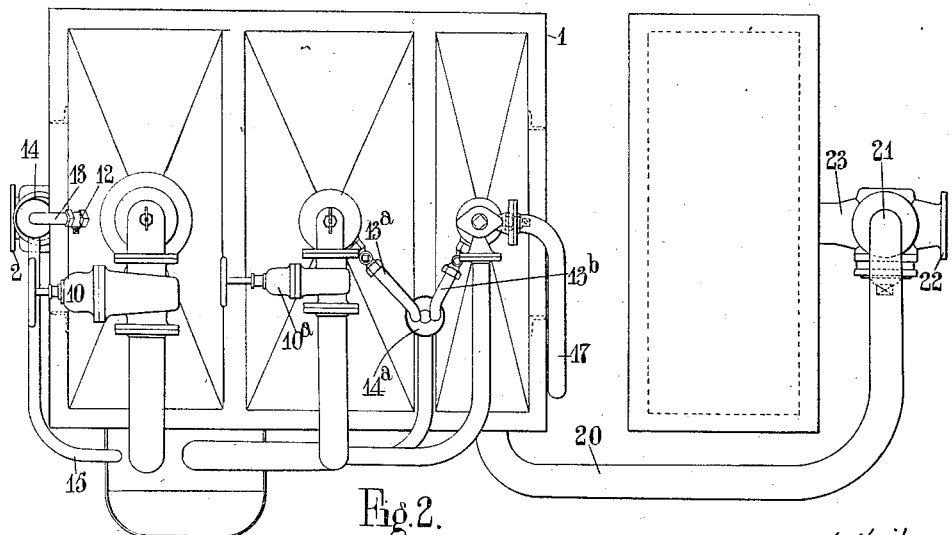

Figure 1 shows a sectional elevation of one form having two upper and two lower baffles;

Figure 2 being a corresponding plan, and

Figure 3:
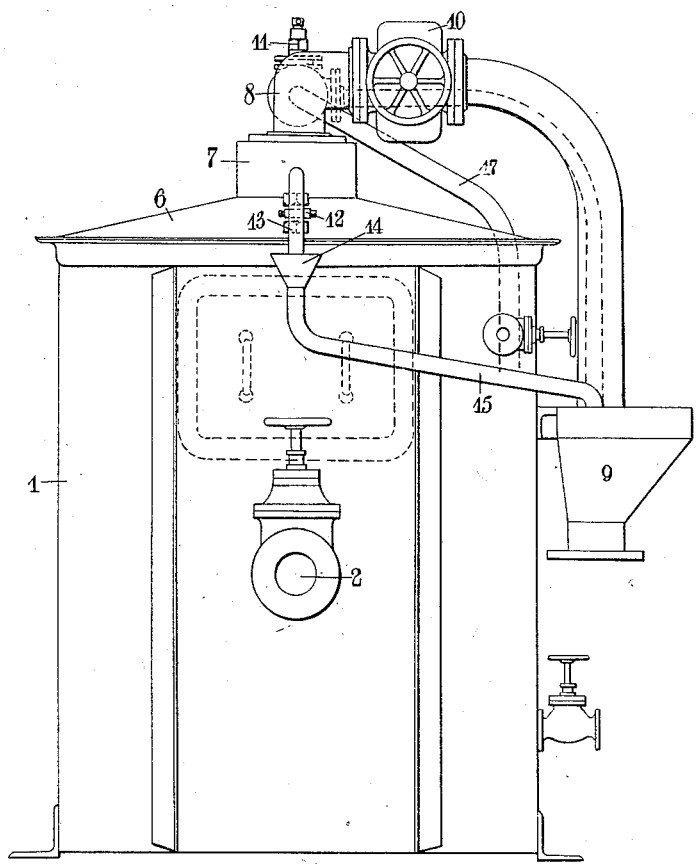

Figure 3 a view looking on the left-hand end of Figures 1 and 2;

Figure 4 shows a sectional elevation of a modified form having only one upper and one lower baffle, while finally, Figure 5 is a view looking on the left-hand end of Figure 4.

Where desirable the same reference symbols are used in the different figures to denote corresponding parts.

In carrying the invention into effect according to one illustrative form (see Figures 1, 2 and 3), a tank, 1, of rectangular cross-section both in plan and elevation is provided to form the separator and has a mixture inlet pipe, 2, situated at about the mid point of its left-hand end as seen in the figures. Attached to this inlet on the inside of the tank is an elbow, 3, rising upwards which terminates in a conical or flaring mouth, 4, serving as a diffuser. A partition or baffle, A', is situated in the tank extending downwards right across the width of the tank and forming a downwardly-narrowing passage or first separating chamber, C, by being brought nearer at the bottom to the end of the tank in which the inlet, 2, is placed. This partition terminates just above the bottom of the tank so as to leave a long narrow opening, 5, right across the tank through which the mixture passes.

On the top of the tank and above the conical mouth, 4, is arranged a cover, 6, which slopes up from the four sides of the first separating chamber, C, formed by the three sides of the tank and the partition, A'. The cover thus forms an upwardly-narrowing passage which leads into a preferably circular dome or oil-collecting chamber, 7, which is connected to a pipe, 8, leading to the oil discharge main, 9, and is provided with a suitable stop valve, 10, and also with an air release valve, 11, situated at the highest point of the pipe.

On a sloping side of the upwardly-narrowing chamber, 6, situated just above the top of the tank is provided a stop cock, 12, with a pipe, 13, leading downwards discharging into a conical funnel, 14, for the purpose of testing whether oil is present in the upwardly-narrowing chamber or not, the conical funnel, 14, being connected by a pipe, 15, to the oil discharge main, 9.

Situated on the side of the partition, A', remote from the inlet valve is an upwardly-extending vertical partition or baffle, B', fixed to the bottom of the tank, this partition extending across the width and terminating somewhat short of the top of the tank. On the side of this first upwardly-extending partition, B', remote from the inlet pipe is a second curved downwardly-extending partition or baffle, A², a second gravity separation chamber, C', being thus formed. This second downwardly-extending partition is brought near to the bottom of the first upwardly-extending partition, B', as shown and terminates near the bottom of the tank so as to form a comparatively narrow opening, 16, right across the tank.

Above the second separating chamber, C², formed by the two downwardly-extending partitions, A', A², is a cover, 6ª, having sloping sides forming another upwardly-narrowing passage which also terminates in a dome or collecting chamber 7ª, having a pipe, 8ª, leading to the oil discharge, 9, and a suitable stop valve, 10ª. An air valve, 11ª, is also provided at the highest point of this pipe.

A second upwardly-extending partition or baffle, B², fixed to the bottom of the tank is provided on the side of the second downwardly-extending partition, A², remote from the inlet and this terminates short of the top of the tank leaving a narrow passage between itself and the second downwardly-extending partition, A². This passage leads into the third gravity separation chamber C³, which is provided with a cover, 6ᵇ, forming an upwardly-narrowing passage provided with a dome, 7ᵇ, or oil collecting chamber having a stop cock, 10ᵇ which according to its setting, leads either by way of the oil delivery pipe, 8ᵇ, to the oil discharge main, 9, or alternatively to the scum drain, 17. An air relief valve, 11ᵇ, is likewise provided as shown.

As described in relation to the first separating chamber, the second and third may likewise be provided with test cocks, 12ª, 12ᵇ, discharging respectively by way of the pipes, 13ª, 13ᵇ, into the common funnel, 14ª, which in turn is connected to the oil discharge main, 9, by the pipes, 15ª.

Between the second upwardly-extending partition, B², and the right-hand end of the tank is provided a horizontal perforated plate, 18, situated just above the bottom of the tank and on this is placed a quantity of filtering material, 19, formed of sand or like granular or pulverulent material of a considerable depth. Below the perforated plate is provided a water discharge pipe, 20.

Alternately, the perforated plate, 18, on which the filtering material rests may be replaced by a grid of perforated pipe, the area of the perforations being suitably proportioned to ensure an even draw-off of filtrate from the whole area of the filter bed.

In either form, a perforated plate is preferably fitted above the filter bed in order to distribute the liquid over the entire surface thereof.

Steam heating coils, 21, are provided in the first separating chamber, C', just above the conical inlet pipe, 4, and also in the bottom of the tank between the first downwardly-extending partition, A', and the first upwardly-extending partition, B'.

By these upwardly and downwardly extending baffles the mixture is constrained to flow downwards from the first separating chamber, C', underneath the baffle, A', by way of the passage, 5, to the second chamber, C², over the first upwardly-extending baffle, B', down again below the second downwardly-extending baffle, A², up into the third separating chamber, C³, and then down through the filtering medium, 19, to the discharge pipe, 20.

The separator is completely enclosed and thus, any desired pressure can be applied to the mixture so as to force it through the separator and to discharge the separated water to any desired point.

The discharge pipe, 20, leads the efflux to a four-way cock, 21, which is provided so that the discharge from the oil separating tank may be either passed straight to the discharge pipe, 22, or to the inlet, 23, of an independent filter, should any traces of "emulsion" or "semi-emulsion" remain in the discharge.

This independent filter may be conveniently formed of a tank, 24, of any suitable cross-section and consists essentially in a comparatively thin layer of sand or other granular or pulverulent material, 25, in some cases of a sharp or gritty nature resting on a layer of felt or the like, 26, the discharge passing off by way of the pipe, 27.

The separator tank may be formed of suitable boiler plates riveted together with angles and other suitable connections and may be rectangular, circular, or any other suitable shape.

In carrying the invention into effect according to a simplified form, (see Figures 4 and 5) the separator consists as before of a rectangular tank, 1, having an inlet, 2, situated at one end connected on the inside by an elbow, 3, projecting upwardly and terminating in a conical or flaring mouth, 4.

A partition or baffle, A', is provided extending downwards right across the tank and curved so as to terminate just above the bottom of the tank close up against the side through which the inlet enters, thus leaving a narrow space, 5, between it and the bottom of the tank for the flow of water. On the top of the tank is provided a cover formed of sloping plates, 28, forming an upwardly-narrowing passage in which the oil collects by gravity, and provided with an outlet pipe, 8, controlled by a suitable valve, 10, and also with an air relief valve, 11. Steam heating coils, 21, may be provided as before.

The tank is also provided with a vertical upwardly-extending baffle, B', fixed to the bottom of the tank and above this is provided a second upwardly narrowing chamber formed of plates, 28ª, secured to the three sides of the tank and the downwardly-extending baffle, A', so as to form a second gravity separating chamber. Between the upwardly extending baffle, B', and the end of the tank remote from the inlet end is situated a perforated plate, 18, extending right across the space formed between the baffle, B', and the sides of the tank, and on the plate, 18, is arranged a filtering medium, 19, composed of sand or like granular or pulverulent material.

The perforated plate, 18, and filtering medium, 19, may be supported on a grid, 29, while below the perforated plate within the grid is situated a discharge pipe, 20, which is led to any suitable point.

In this modification the mixture of oil and water is discharged upwards into the first separating chamber, C', where the oil rises and the water descends passing below the downwardly-extending baffle, A', and then rises to the second separating chamber, $C^2$, where the remainder of the oil collects. The liquid then flows downwardly through the filtering material, 19, in which the last traces of the "emulsion" or semi-emulsion" are entrapped, and out through the discharge pipe, 20.

By decreasing the number of separating chambers as compared with the form shown in Figures 1 to 3, accommodation can thus be provided for a filter of sufficient size within the separator tank itself, though if desired an additional filter may be provided through which the discharge may be passed should any traces of "emulsion" or "semi-emulsion" be left.

The forms of the invention described above may be modified or adapted to work under atmospheric pressure if desired.

Having now described my invention, what I claim as new and desire to secure by Letters Patent is:—

1. A separator of the kind indicated comprising a container having an inlet and an outlet, a first separator chamber therein, having a part converging in an upward direction, and partition means within said container to form downward and upward passages leading mixture from said first separation chamber to the outlet from said container, each of said passages converging in the direction of flow.

2. A separator as claimed in chain 1, in which said container has a floor and a roof and said partition means take the form of baffles in association alternately with said floor and roof, said baffles being alternately curved and plane.

3. A separator as claimed in claim 1, in which the container has a vertical wall in which the inlet is located and having also a roof and said downward passage being formed by said vertical wall and by a baffle depending from said roof and curved towards said vertical wall.

4. A separator as claimed in claim 1, having more than one separator chamber each having a part converging in an upward direction, said chambers being operatively connected by said downward and upward passages.

5. A separator as claimed in claim 1, in which the container has a cover with sloping sides, constituting said upwardly-converging part.

6. A separator as claimed in claim 1, having a duct leading from said inlet to a flaring mouth opening upwards, said mouth being arranged in operative association with said first separation chamber.

In testimony whereof I have signed my name to this specification.

WILLIAM ALBERT WHITE.